(12) United States Patent
Kwon (10) Patent No.: US 9,471,218 B2
(45) Date of Patent: Oct. 18, 2016

(54) APPARATUS AND METHOD FOR CONTROLLING DISPLAY SIZE IN PORTABLE TERMINAL

(75) Inventor: Woo-Up Kwon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 207 days.

(21) Appl. No.: 13/619,516

(22) Filed: Sep. 14, 2012

(65) Prior Publication Data

US 2013/0076671 A1 Mar. 28, 2013

(30) Foreign Application Priority Data

Sep. 23, 2011 (KR) .......................... 10-2011-0096296

(51) Int. Cl.
*G06F 3/041* (2006.01)
*G06F 3/0488* (2013.01)

(52) U.S. Cl.
CPC ......... *G06F 3/0488* (2013.01); *G06F 3/04886* (2013.01)

(58) Field of Classification Search
CPC ........................ G06F 3/0488; G06F 3/04886
USPC ................ 345/173, 661, 156, 168, 174, 157
See application file for complete search history.

(56) References Cited

U.S. PATENT DOCUMENTS

| 9,323,388 | B2* | 4/2016 | Yumoto | G06F 3/044 345/173 |
| 2001/0004254 | A1* | 6/2001 | Okahara | G06F 3/038 345/157 |
| 2006/0026521 | A1 | 2/2006 | Hotelling et al. | |
| 2007/0109323 | A1 | 5/2007 | Nakashima | |
| 2007/0152984 | A1 | 7/2007 | Ording et al. | |
| 2007/0177804 | A1 | 8/2007 | Elias et al. | |
| 2008/0225014 | A1 | 9/2008 | Kim | |
| 2009/0094562 | A1 | 4/2009 | Jeong et al. | |
| 2010/0088634 | A1 | 4/2010 | Tsuruta et al. | |
| 2010/0127997 | A1* | 5/2010 | Park | G06F 3/0416 345/173 |
| 2011/0141144 | A1 | 6/2011 | Tomono | |
| 2012/0019562 | A1* | 1/2012 | Park | G06F 3/0488 345/657 |
| 2012/0026201 | A1* | 2/2012 | Amano | 345/661 |
| 2015/0012875 | A1* | 1/2015 | Miyazaki | G06F 3/044 715/773 |

FOREIGN PATENT DOCUMENTS

| CN | 101379461 | 3/2009 |
| CN | 101410781 | 4/2009 |
| JP | H 056246 | 1/1993 |
| JP | 2007-140060 | 6/2007 |
| JP | 2009-211244 | 9/2009 |
| JP | 2010-044628 | 2/2010 |
| KR | 10-2010-0075317 | 7/2010 |
| WO | WO 02/08881 A2 | 1/2002 |
| WO | WO 2008-090902 A1 | 7/2008 |

OTHER PUBLICATIONS

Extended European Search Report dated Jan. 2, 2013 in connection with European Patent Application No. 12183081.4, 7 pages.
Notice of Preliminary Rejection dated May 10, 2016 in connection with Japanese Patent Application No. 2012-210166, 8 pages.
First Office Action dated Aug. 3, 2016 in connection with Chinese Application No. 201210352086.5, 17 pages.

* cited by examiner

*Primary Examiner* — Thuy Pardo (57) ABSTRACT

An apparatus and method for control a size of a display region in a portable terminal. The method includes determining a size control amount based on touch information when a size change event occurs and controlling a size of the display region according to the size control amount.

18 Claims, 13 Drawing Sheets

APPARATUS AND METHOD FOR CONTROLLING DISPLAY SIZE IN PORTABLE TERMINAL

CROSS-REFERENCE TO RELATED APPLICATION(S) AND CLAIM OF PRIORITY

The present application is related to and claims priority under 35 U.S.C. §119 to an application filed in the Korean Intellectual Property Office on Sep. 23, 2011 and assigned Serial No. 10-2011-0096296, the contents of which are incorporated herein by reference.

TECHNICAL FIELD OF THE INVENTION

The present disclosure relates generally to a user interface (UI) of a portable terminal.

BACKGROUND OF THE INVENTION

Portable terminals, which have become necessary articles for modem persons due to their portability, are evolving into multimedia devices that provide various services such as voice call, video call, information input/output, and data storage.

Portable terminals provide multimedia services as described above, and the amount of information to be processed and displayed by the portable terminals increases accordingly. Thus, there is an increasing interest in portable terminals with a touchscreen, which can increase a display size by improving space utilization.

A touchscreen is an input/output device that makes it possible to input and display information on one screen. Accordingly, when using a touchscreen, a portable terminal can increase a display area by removing a separate input device such as a keypad. For example, when using a full-touch mode that applies a touchscreen to the entire display screen, a portable terminal can increase a display size by utilizing the front side as a display screen.

As described above, a portable terminal can provide various multimedia services through a larger display screen by using a touchscreen. However, a portable terminal with a touchscreen requires a separate user interface for the touchscreen because it is different in operation method from a portable terminal with a separate input device.

SUMMARY OF THE INVENTION

To address the above-discussed deficiencies of the prior art, it is a primary object to provide at least the advantages below. Accordingly, an object of the present disclosure is to provide an apparatus and method for controlling a portable terminal with a touchscreen.

Another object of the present disclosure is to provide an apparatus and method for controlling a display size in a portable terminal with a touchscreen.

Another object of the present disclosure is to provide an apparatus and method for controlling a size of a display region, on which information is displayed, in a portable terminal with a touchscreen.

Another object of the present disclosure is to provide an apparatus and method for controlling a display region size in a specific direction in a portable terminal with a touchscreen.

Another object of the present disclosure is to provide an apparatus and method for controlling a display region size by multitouch in a portable terminal with a touchscreen.

According to an aspect of the present disclosure, a method for controlling a size of a display region in a portable terminal with a touchscreen includes: determining a size control amount based on touch information when a size change event occurs; and controlling a size of the display region according to the size control amount.

According to another aspect of the present disclosure, an apparatus for controlling a size of a display region in a portable terminal includes: a touchscreen; and a control unit for controlling a size of the display region according to a size control amount determined based on touch information, when a size change event occurs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6H, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein must be understood based on the descriptions made herein.

Hereinafter, a description will be given of a technology for controlling a size of a display region in a portable terminal according to the present disclosure.

In the following description, the portable terminal refers to an electronic apparatus with a touchscreen, such as personal digital assistant (PDA), laptop computer, smart phone, netbook, mobile Internet device (MID), ultra mobile personal computer (UMPC), tablet PC, navigation device, and MPEG Audio Layer-3 (MP3) player.

Figure 1:
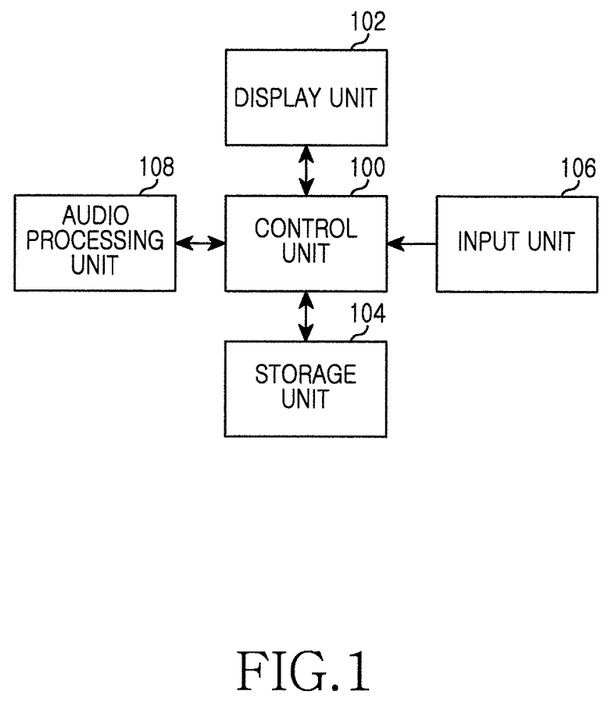
FIG. 1 illustrates a block diagram of a portable terminal according to the present disclosure.

FIG. 1 illustrates a block diagram of a portable terminal according to the present disclosure.

Referring to FIG. 1, the portable terminal may include a control unit 100, a display unit 102, a storage unit 104, an input unit 106, and an audio processing unit 108.

The control unit 100 controls an overall operation of the portable terminal.

When a size change event occurs, the control unit 100 may control the display unit 102 to control a size of a display region. Specifically, the control unit 100 may determine whether a size change event occurs. For example, when a touch to an outer detection region of the display unit 102 is maintained for a predetermined time or more, the control unit 100 may determine that a size change event occurs. As another example, when a multitouch to at least two outer detection regions of the display unit 102 is maintained for a predetermined time or more, the control unit 100 may determine that a size change event occurs. Herein, the detection region may include a 1-pixel region of at least one side among four sides of the display unit 102. The display region may refer to a region in the display unit 102 on which information is displayed.

When a size change event occurs, the control unit 100 may determine a display size control amount. For example, the control unit 100 may determine a display size control amount based on drag information. As another example, the control unit 100 may determine a display size control amount based on touch information detected after the occurrence of a size change event.

In addition, the control unit 100 may determine a display change direction. For example, the control unit 100 may determine a display change direction based on drag information. As another example, the control unit 100 may determine a display change direction based on a size change event occurrence point. As yet another example, the control unit 100 may determine a display change direction based on a touch point detected after the occurrence of a size change event.

The control unit 100 may control a size of the display region in the display unit 102 based on a display size control amount. For example, the control unit 100 may control a total size of the display region at a predetermined ratio according to a display size control amount. As another example, the control unit 100 may control a size of the display region in a display change direction according to a display size control amount.

The display unit 102 may include a touchscreen that performs both an information display function and an information input function. For example, under the control of the control unit 100, the display unit 120 may display status information of the portable terminal, characters inputted by a user, moving pictures, and still pictures. Also, the display unit 102 may provide information on a user's touch to the control unit 100.

The display unit 102 may display size change event occurrence information under the control of the control unit 100. For example, when a size change event occurs, the display unit 102 may thicken an outline of the display region. As another example, when a size change event occurs, the display unit 102 may shade the display region. As yet another example, when a size change event occurs, the display unit 102 may shake icons included in the display region. As still yet another example, when a size change event occurs, the display unit 102 may display a size change event icon.

The display unit 102 may control a size of the display region under the control of the control unit 100. For example, the display unit 102 may control a total size of the display region at a predetermined ratio under the control of the control unit 100. As another example, the display unit 102 may control a size of the display region in a display change direction under the control of the control unit 100.

The storage unit 104 may include a program storage unit storing a program for controlling an operation of the portable terminal, and a data storage unit storing data generated during the execution of a program. For example, the program storage unit of the storage unit 104 may store a program for controlling a display region size. In this example, the control unit 100 may control a display region size by executing the program that is stored in the program storage unit to control a display region size.

The input unit 106 may provide the control unit 100 with input data generated by user's selection. For example, the input unit 106 may include only a control button for controlling the portable terminal. As another example, the input unit 106 may include a keypad for receiving input data from the user in separation from the display unit 102.

The audio processing unit 108 may control the input/output of an audio signal.

When providing a communication service, the portable terminal may further include a communication module.

Hereinafter, a description will be given of a method for controlling a size of the display region in the portable terminal according to user's operations.

Figure 2:
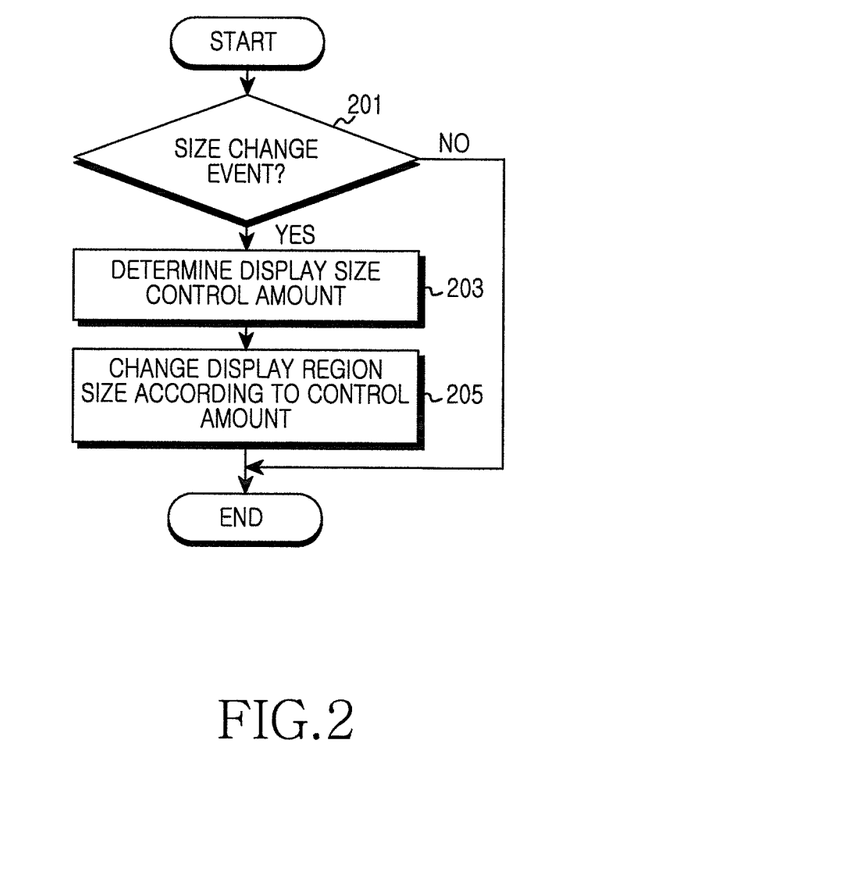
FIG. 2 illustrates a process for controlling a display size in the portable terminal according to an exemplary embodiment of the present disclosure.

FIG. 2 illustrates a process for controlling a display size in the portable terminal according to an exemplary embodiment of the present disclosure.

Referring to FIG. 2, in step 201, the portable terminal determines whether a size change event occurs. For example, when a touch to an outer detection region of the display unit 102 is maintained for a predetermined time or more, the control unit 100 may determine that a size change event occurs. Herein, the detection region may include a 1-pixel region of at least one side among four sides of the display unit 102.

When a size change event does not occur, the portable terminal ends the present algorithm.

Figure 6A:
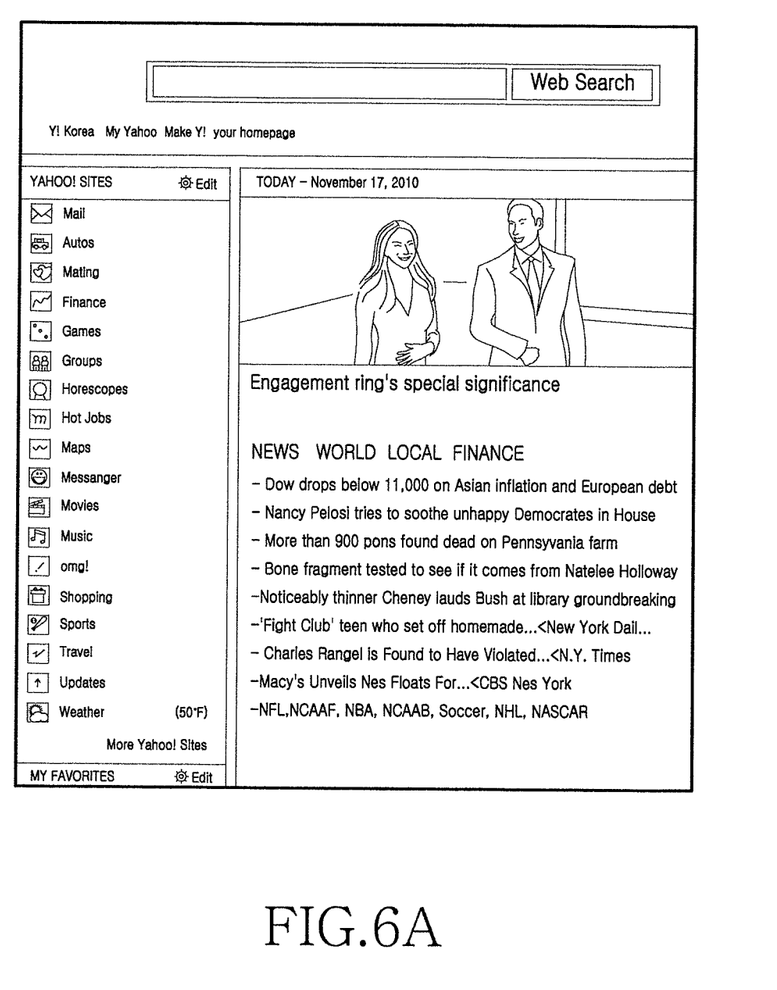
FIGS. 6A through 6H illustrate a display configuration for controlling a display size in the portable terminal according to exemplary embodiments of the present disclosure.
Figure 6B:
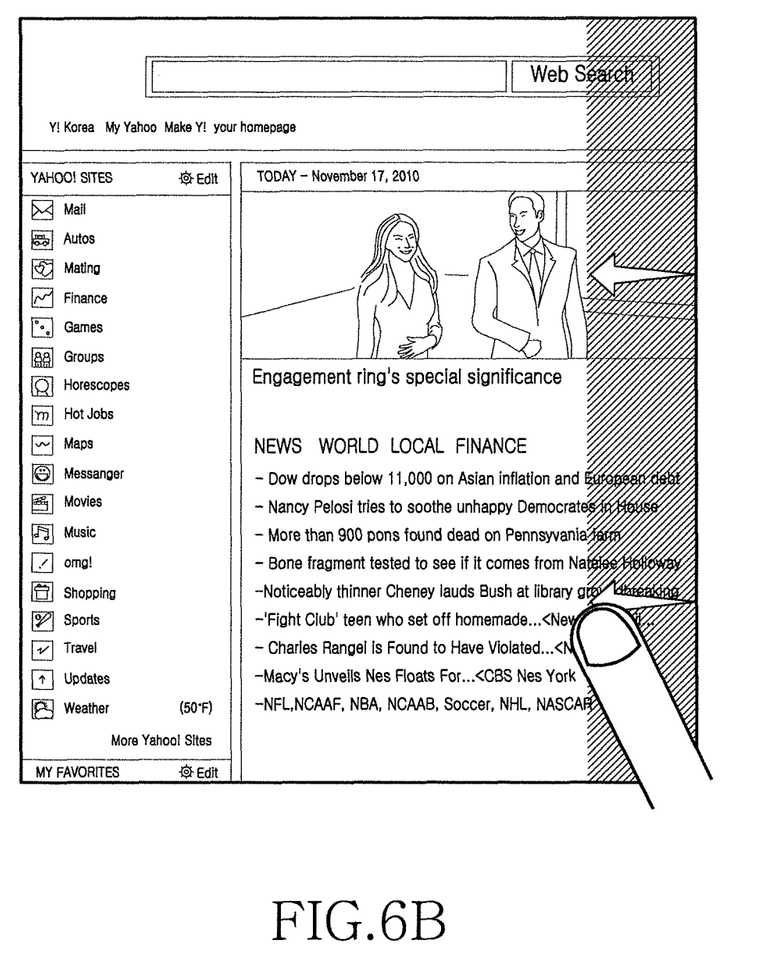
Figure 6C:
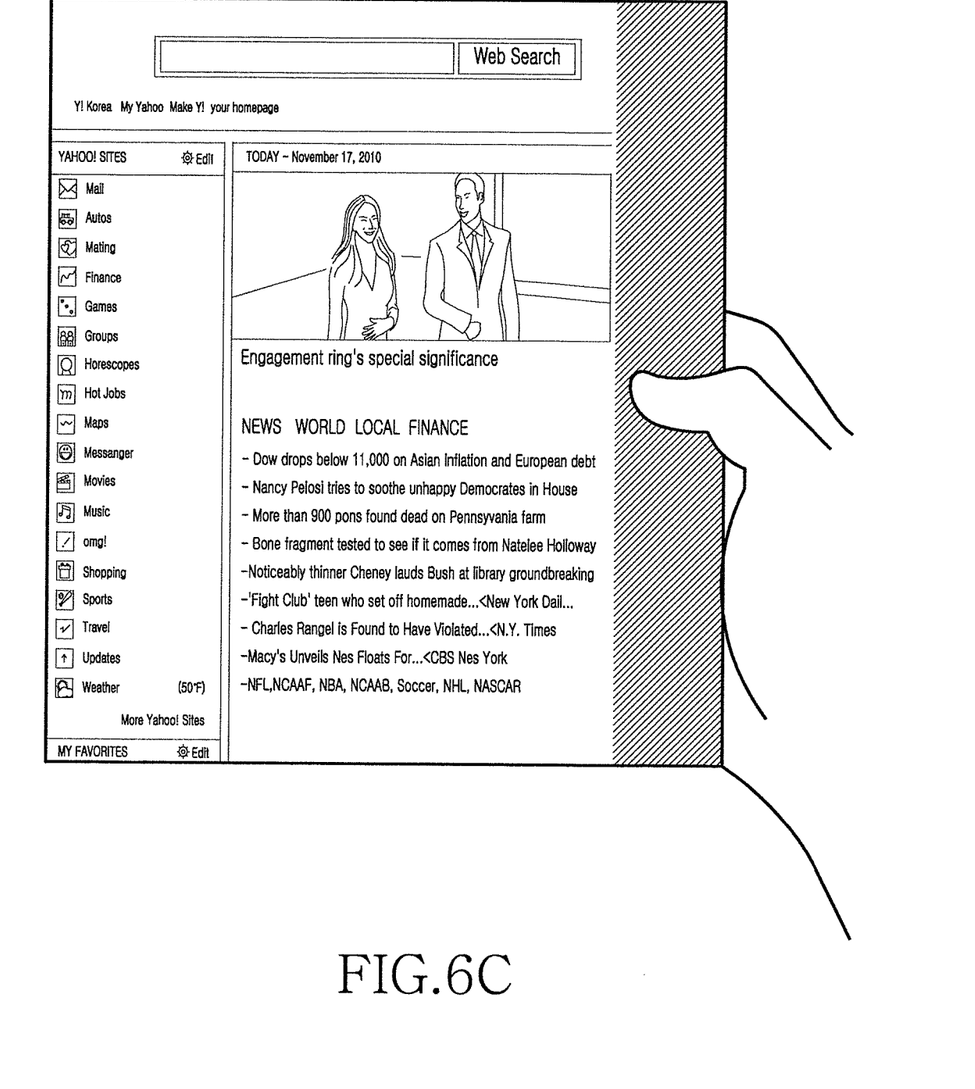
Figure 6D:
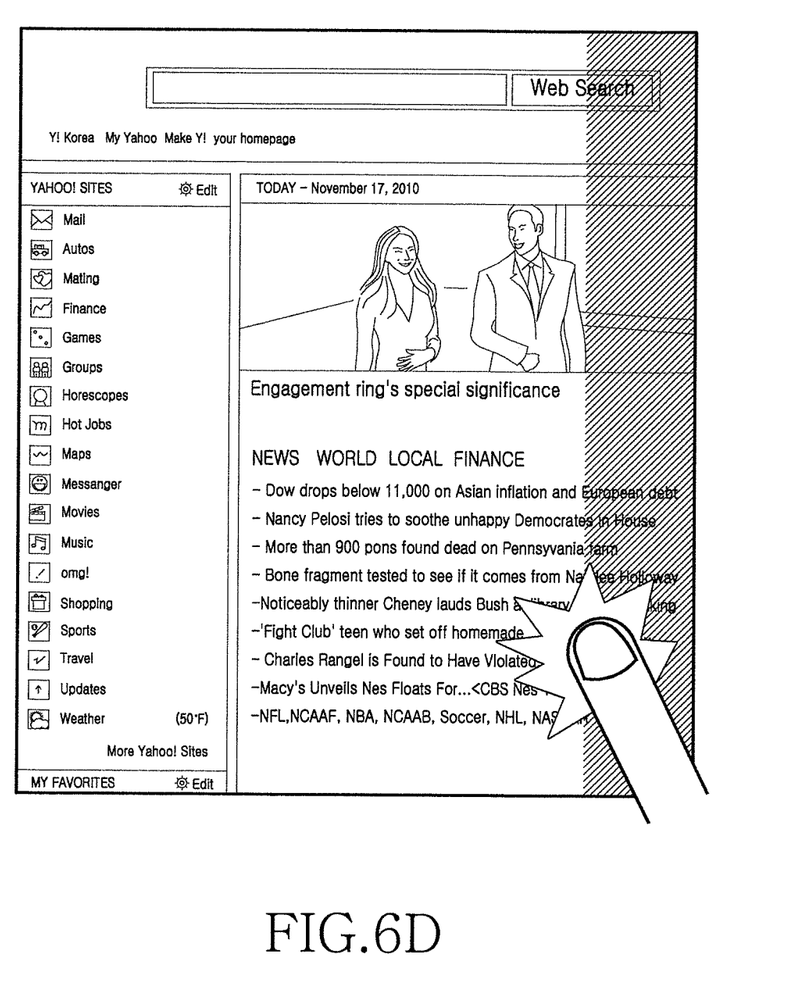

On the other hand, when a size change event occurs, the portable terminal proceeds to step 203. In step 203, the portable terminal determines a display size control amount based on touch information. For example, as illustrated in FIG. 6B, the portable terminal may determine a display size control amount based on drag information. As another example, as illustrated in FIG. 6D, the portable terminal may determine a display size control amount based on a touch point detected after the occurrence of a size change event.

Thereafter, in step 205, the portable terminal controls a size of the display region based on the display size control amount. For example, as illustrated in FIG. 6C, the portable terminal may reduce a size of the display region in a specific direction. As another example, the portable terminal may reduce a total size of the display region at a predetermined ratio according to a display size control amount.

Thereafter, the portable terminal ends the present algorithm.

In the above embodiment, when a size change event occurs, the portable terminal determines a display size control amount.

In this example, the portable terminal may display size change event occurrence information so that the user can recognize the display size change event occurrence. For example, the portable terminal may thicken an outline of the display region to represent the display size change event occurrence information. As another example, the portable terminal may shade the display region to represent the display size change event occurrence information to represent the display size change event occurrence information. As yet another example, the portable terminal may shake icons included in the display region to represent the display size change event occurrence information. As still yet another example, the portable terminal may display a size change event icon to represent the display size change event occurrence information.

In the above embodiment, the portable terminal may control a size of the display region based on only the display size control amount.

Figure 3:
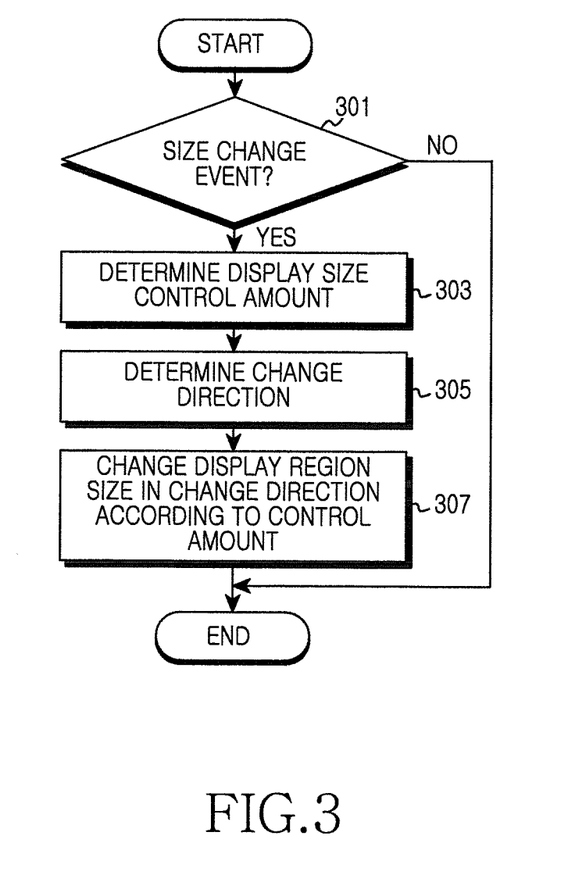
FIG. 3 illustrates a process for controlling a display size in a certain direction in the portable terminal according to an exemplary embodiment of the present disclosure.

In another embodiment, as illustrated in FIG. 3, the portable terminal may control a size of the display region based on a display size control amount and a display change direction.

FIG. 3 illustrates a process for controlling a display size in a certain direction in the portable terminal according to an exemplary embodiment of the present disclosure.

Referring to FIG. 3, in step 301, the portable terminal determines whether a size change event occurs. For example, when a touch to an outer detection region of the display unit 102 is maintained for a predetermined time or more, the control unit 100 may determine that a size change event occurs. Herein, the detection region may include a 1-pixel region of at least one side among four sides of the display unit 102.

When a size change event does not occur, the portable terminal ends the present algorithm.

On the other hand, when a size change event occurs, the portable terminal proceeds to step 303. In step 303, the portable terminal determines a display size control amount based on touch information. For example, as illustrated in FIG. 6B, the portable terminal may determine a display size control amount based on drag information. As another example, as illustrated in FIG. 6D, the portable terminal may determine a display size control amount based on a touch point detected after the occurrence of a size change event.

Thereafter, in step 305, the portable terminal determines a display change direction. For example, the portable terminal may determine a display change direction based on a drag direction. As another example, the portable terminal may determine a display change direction based on a size change event occurrence point. As yet another example, the portable terminal may determine a display change direction based on a touch point detected after the occurrence of a size change event.

Figure 6E:
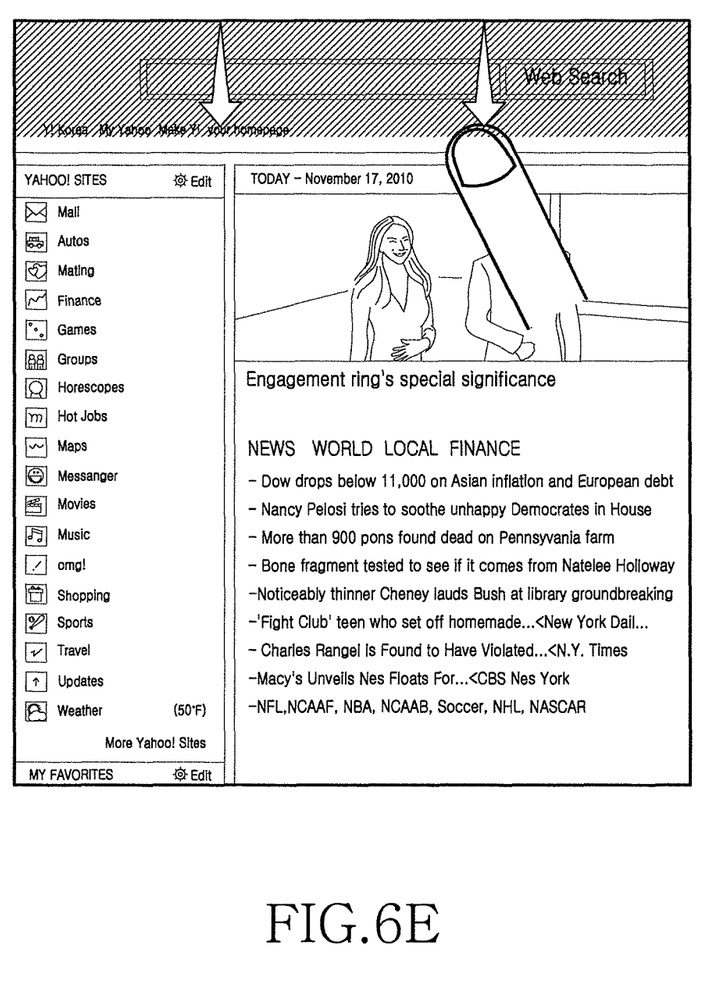
Figure 6F:
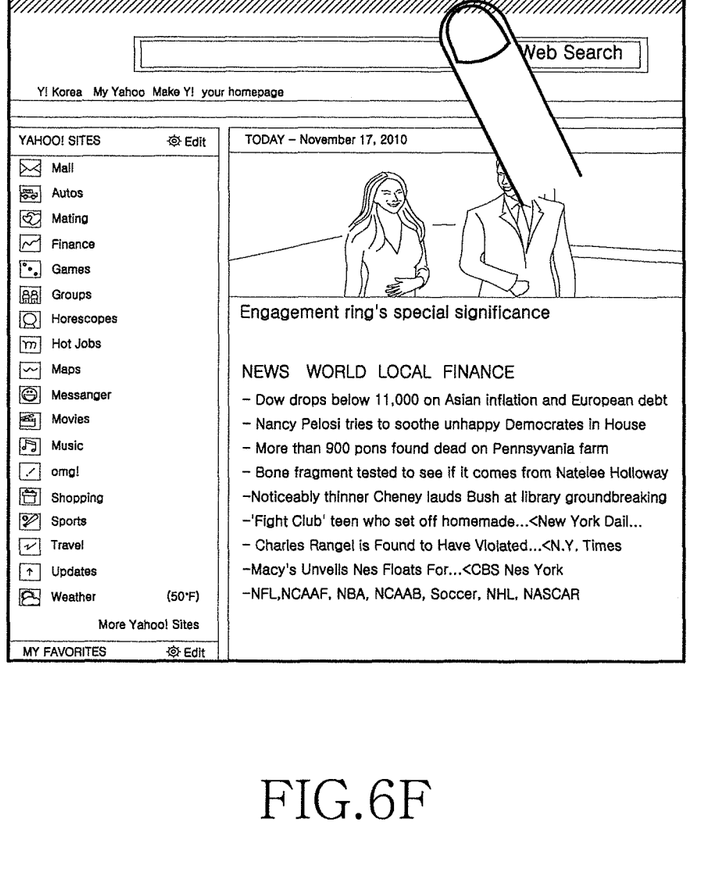

Thereafter, in step 307, the portable terminal controls a size of the display region based on the display size control amount and the display change direction. For example, as illustrated in FIG. 6C, the portable terminal may reduce a left side size of the display region according to a display size control amount and a display change direction. As another example, as illustrated in FIG. 6F, the portable terminal may reduce a top side size of the display region according to a display size control amount and a display change direction.

Thereafter, the portable terminal ends the present algorithm.

In the above embodiment, when a size change event occurs, the portable terminal determines a display size control amount.

In this example, the portable terminal may display size change event occurrence information so that the user can recognize the display size change event occurrence. For example, the portable terminal may thicken an outline of the display region to represent the display size change event occurrence information. As another example, the portable terminal may shade the display region to represent the display size change event occurrence information to represent the display size change event occurrence information. As yet another example, the portable terminal may shake icons included in the display region to represent the display size change event occurrence information. As still yet another example, the portable terminal may display a size change event icon to represent the display size change event occurrence information.

In the above embodiment, the portable terminal may control a size of the display region based on a single touch.

Figure 4:
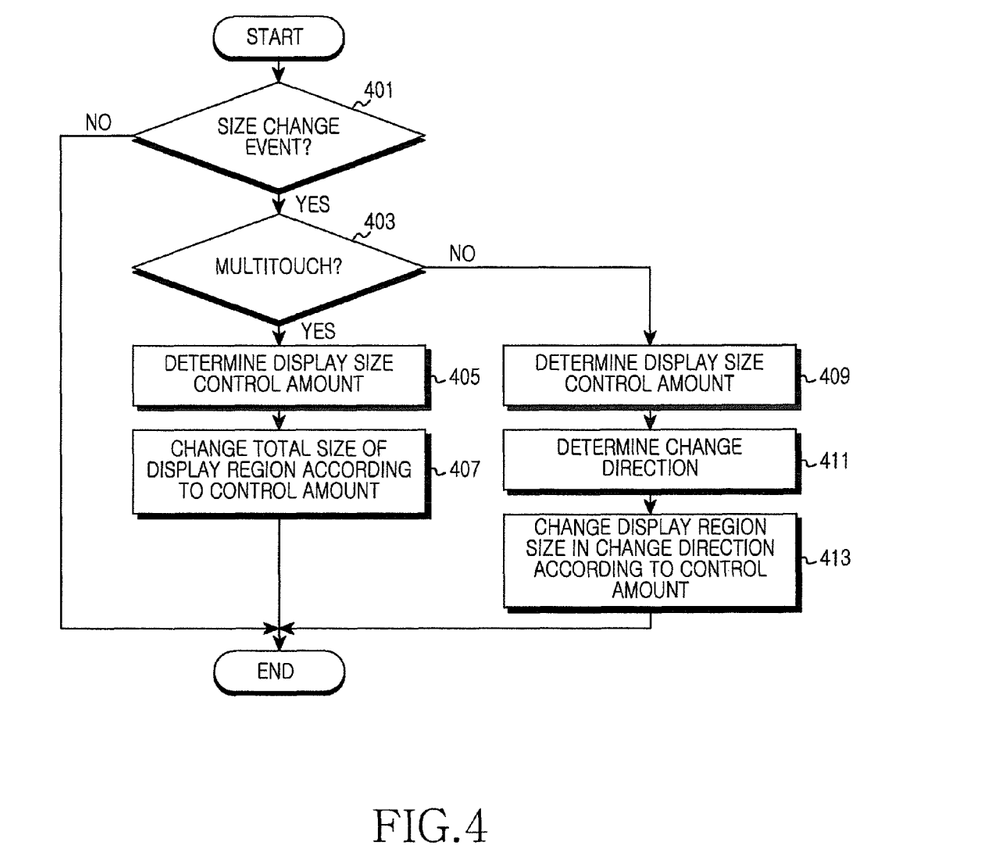
FIG. 4 illustrates a process for controlling a display size by multitouch in the portable terminal according to an exemplary embodiment of the present disclosure.

In another embodiment, as illustrated in FIG. 4, the portable terminal may control a size of the display region based on a multitouch.

FIG. 4 illustrates a process for controlling a display size by multitouch in the portable terminal according to an exemplary embodiment of the present disclosure.

Referring to FIG. 4, in step 401, the portable terminal determines whether a size change event occurs. For example, when at least one touch to at least one outer detection region of the display unit 102 is maintained for a predetermined time or more, the control unit 100 may determine that a size change event occurs. Herein, the detection region may include a 1-pixel region of at least one side among four sides of the display unit 102.

When a size change event does not occur, the portable terminal ends the present algorithm.

On the other hand, when a size change event occurs, the portable terminal proceeds to step 403. In step 403, the portable terminal determines whether a multitouch is detected. For example, the portable terminal may determine whether a size change event occurs by a multitouch.

Figure 6G:
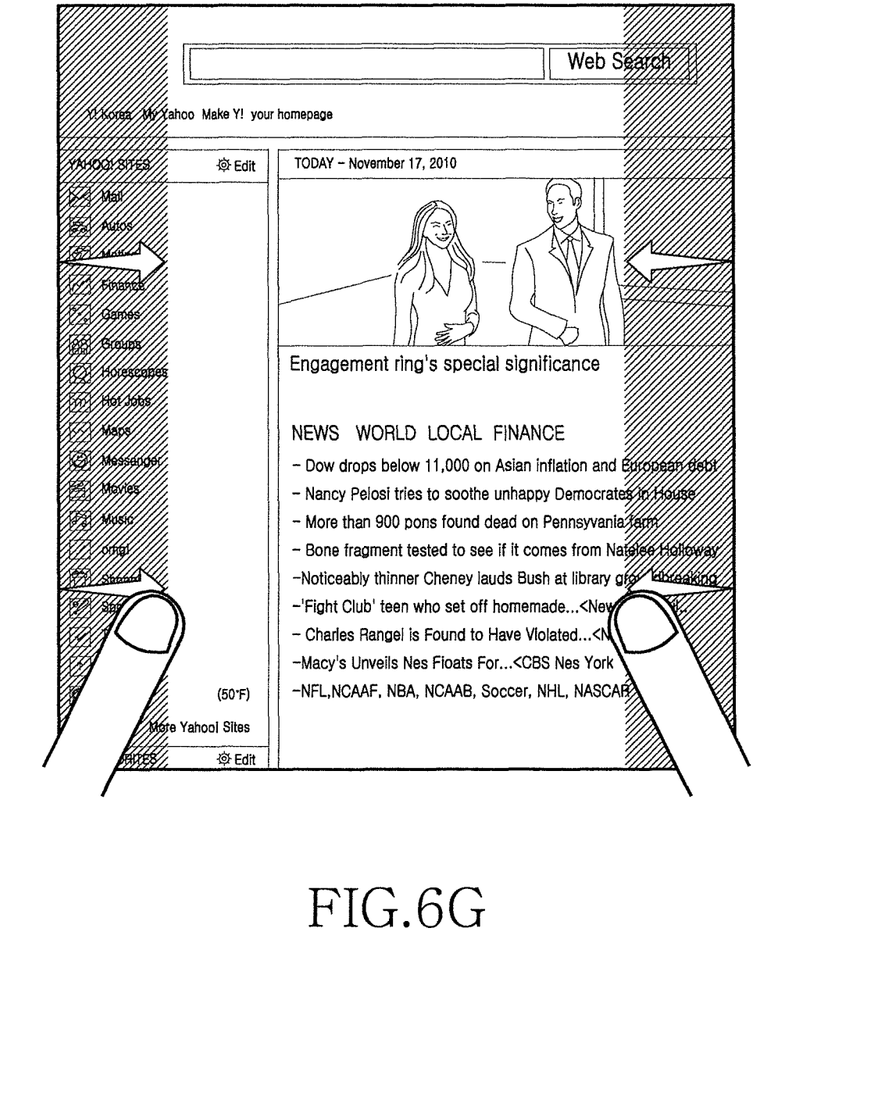

When a multitouch is detected, the portable terminal determines that a total size of the display region is controlled. Accordingly, in step 405, the portable terminal determines a display size control amount based on a change in multitouch points. For example, as illustrated in FIG. 6G, the portable terminal may determine a display size control amount based on drag information of multitouch points. As another example, the portable terminal may determine a display size control amount based on a change in the distance between multitouch points.

Figure 6H:
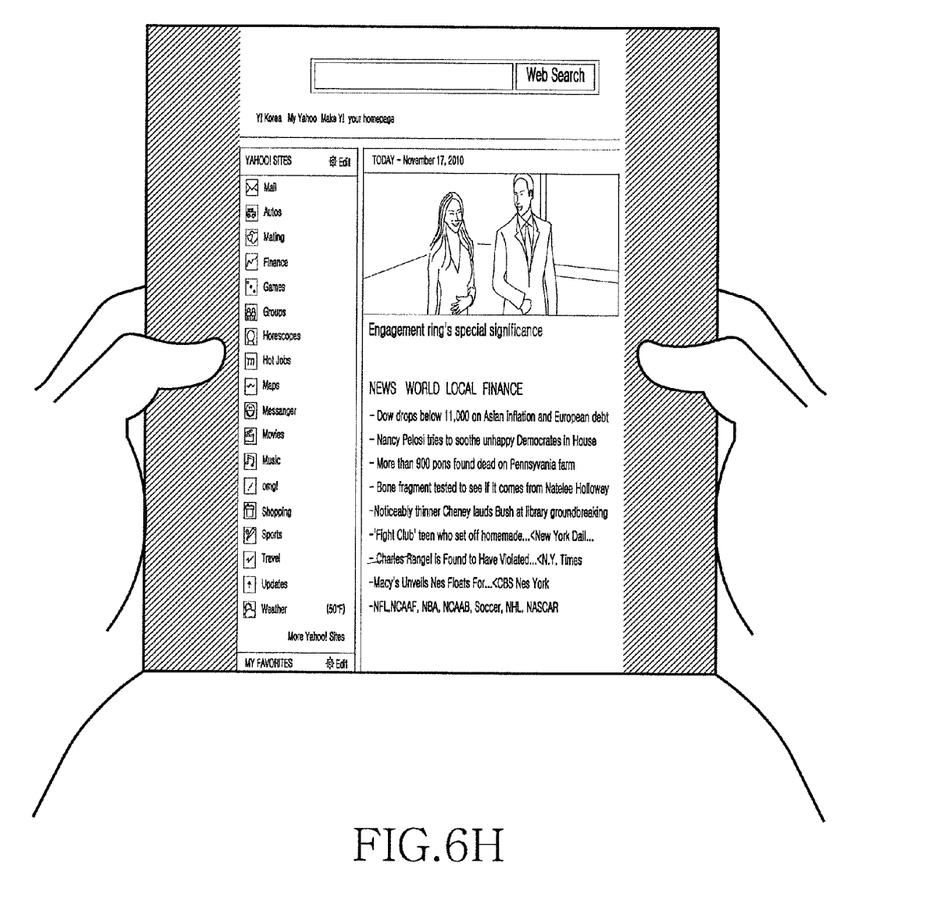

Thereafter, in step 407, the portable terminal controls a size of the display region based on the display size control amount. For example, the portable terminal may reduce a total size of the display region at a predetermined ratio according to a display size control amount. As another example, as illustrated in FIG. 6H, the portable terminal may reduce a size of the display region in a plurality of directions according to a display size control amount.

On the other hand, when a multitouch is not detected in step 403, the portable terminal determines that a size of the display region is controlled in a specific direction. Accordingly, in step 409, the portable terminal determines a display size control amount based on touch information. For example, as illustrated in FIG. 6B, the portable terminal may determine a display size control amount based on drag information. As another example, as illustrated in FIG. 6D, the portable terminal may determine a display size control amount based on touch information detected after the occurrence of a size change event.

Thereafter, in step 411, the portable terminal determines a display change direction. For example, the portable terminal may determine a display change direction based on a drag direction. As another example, the portable terminal may determine a display change direction based on a size change event occurrence point. As yet another example, the portable terminal may determine a display change direction based on touch information detected after the occurrence of a size change event.

Thereafter, in step 413, the portable terminal controls a size of the display region based on the display size control amount and the display change direction. For example, when a display size control amount and a display change direction are determined based on a drag, distance and direction as illustrated in FIG. 6B, the portable terminal may reduce a display region size in a leftward direction by the display size control amount as illustrated in FIG. 6C. As another example, when a display size control amount and a display change direction are determined based on a drag distance and direction of the user as illustrated in FIG. 6E, the portable terminal may reduce a display region size in a downward direction by the display size control amount as illustrated in FIG. 6F.

Thereafter, the portable terminal ends the present algorithm.

In the above embodiment, when a size change event occurs, the portable terminal determines whether a multitouch is detected.

In another embodiment, when a size change event occurs, the portable terminal may determine whether a multitouch is detected, after displaying size change event occurrence information so that the user can recognize the display size change event occurrence. For example, the portable terminal may thicken an outline of the display region to represent the display size change event occurrence information. As another example, the portable terminal may shade the display region to represent the display size change event occurrence information to represent the display size change event occurrence information. As yet another example, the portable terminal may shake icons included in the display region to represent the display size change event occurrence information. As still yet another example, the portable terminal may display a size change event icon to represent the display size change event occurrence information.

In the above embodiment, when detecting a multitouch, the portable terminal may control a total size of the display region.

Figure 5:
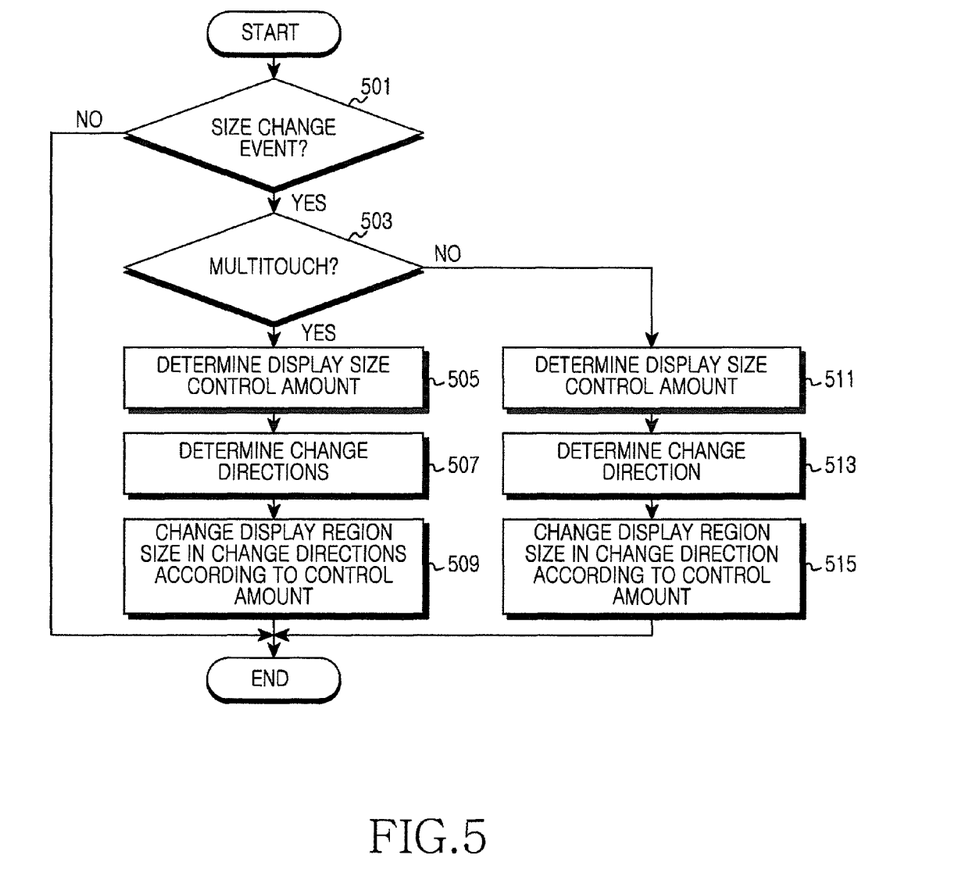
FIG. 5 illustrates a process for controlling a display size in a certain direction by multitouch in the portable terminal according to an exemplary embodiment of the present disclosure.

In another embodiment, as illustrated in FIG. 5, when detecting a multitouch, the portable terminal may control a size of the display region in a plurality of directions.

FIG. 5 illustrates a process for controlling a display size in a certain direction by multitouch in the portable terminal according to an exemplary embodiment of the present disclosure.

Referring to FIG. 5, in step 501, the portable terminal determines whether a size change event occurs. For example, when a touch to at least one outer detection region of the display unit 102 is maintained for a predetermined time or more, the control unit 100 may determine that a size change event occurs. Herein, the detection region may include a 1-pixel region of at least one side among four sides of the display unit 102.

When a size change event does not occur, the portable terminal ends the present algorithm.

On the other hand, when a size change event occurs, the portable terminal proceeds to step 503. In step 503, the portable terminal determines whether a multitouch is detected. For example, the portable terminal may determine whether a size change event occurs by a multitouch to a plurality of detection regions.

When a multitouch to a plurality of detection regions is detected, the portable terminal determines that a size of the display region is controlled in a plurality of directions. Accordingly, in step 505, the portable terminal determines a display size control amount in each of the display region size change directions. For example, when a multitouch is detected as illustrated in FIG. 6G, the portable terminal may determine a display size control amount in each of the display region size change directions based on a drag distance of each touch point. As another example, the portable terminal may determine a display size control amount in each of the display region size change directions based on a plurality of touch points detected after the occurrence of a touch event.

Thereafter, in step 507, the portable terminal determines display region size change directions. For example, the portable terminal may determine a display region size change direction based on a drag direction. As another example, the portable terminal may determine a display region size change direction based on size change event occurrence points. As yet another example, the portable terminal may determine a display region size change direction based on touch points detected after the occurrence of a size change event.

Thereafter, in step 509, the portable terminal controls a size of the display region based on the display size control amount and the display change direction. For example, when a display size control amount and a display change direction are determined based on a drag distance and direction as illustrated in FIG. 6G, the portable terminal may reduce a display region size in leftward rightward directions by the display size control amount as illustrated in FIG. 6H.

On the other hand, when a multitouch is not detected in step 503, the portable terminal determines that a size of the display region is controlled in a certain direction. Accordingly, in step 511, the portable terminal determines a display size control amount. For example, as illustrated in FIG. 6B, the portable terminal may determine a display size control amount based on drag information. As another example, as illustrated in FIG. 6D, the portable terminal may determine a display size control amount based on touch information detected after the occurrence of a size change event.

Thereafter, in step 513, the portable terminal determines a display change direction. For example, the portable terminal may determine a display change direction based on a drag direction of the user. As another example, the portable terminal may determine a display change direction based on a size change event occurrence point. As yet another example, the portable terminal may determine a display change direction based on touch information detected after the occurrence of a size change event.

Thereafter, in step 515, the portable terminal controls a size of the display region based on the display size control amount and the display change direction. For example, when a display size control amount and a display change direction are determined based on a drag distance and direction of the user as illustrated in FIG. 6B, the portable terminal may reduce a display region size in a leftward direction by the display size control amount as illustrated in FIG. 6C. As another example, when a display size control amount and a display change direction are determined based on a drag distance and direction of the user as illustrated in FIG. 6E, the portable terminal may reduce a display region size in a downward direction by the display size control amount as illustrated in FIG. 6F.

Thereafter, the portable terminal ends the present algorithm.

In the above embodiment, when a size change event occurs, the portable terminal determines whether a multi-touch is detected.

In another embodiment, when a size change event occurs, the portable terminal may determine whether a multitouch is detected, after displaying size change event occurrence information so that the user can recognize the display size change event occurrence. For example, the portable terminal may thicken an outline of the display region to represent the display size change event occurrence information. As another example, the portable terminal may shade the display region to represent the display size change event occurrence information to represent the display size change event occurrence information. As yet another example, the portable terminal may shake icons included in the display region to represent the display size change event occurrence information. As still yet another example, the portable terminal may display a size change event icon to represent the display size change event occurrence information.

In the above embodiment, the portable terminal determines a display change direction after determining a screen size control amount. In another embodiment, the portable terminal may simultaneously determine a screen size control amount and a display change direction. In yet another embodiment, the portable terminal may determine a screen size control amount after determining a display change direction.

As described above, the present disclosure controls a size of an information display region in a portable terminal with a touchscreen, thereby making it possible to easily control a display size according to the intention of a user of the portable terminal.

Also, when a wide display region is unnecessary, the present disclosure reduces a size of a display region in the portable terminal by user's operations, thereby making it possible to reduce the power consumption of the portable terminal.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method to control a display in an electronic apparatus, the method comprising:
   detecting a touch input;
   determining an amount of a display change based on a touch point that corresponds to a location of the touch input on the display;
   determining a display change direction based on the touch point; and
   changing a size of the display region based on the determined amount and the display change direction, wherein the display region comprises a region of a touchscreen on which information is displayed.

2. The method of claim 1, wherein detecting the touch input comprises:
   in response to detecting a touch to at least one detection region included in the display region, determining whether a size change event occurs based on touch information on the detection region;
   in response to determining the size change event occurs, detecting the touch input to change the size of the display region.

3. The method of claim 2, further comprising:
   displaying size change event occurrence information in response to the occurrence of the size change event.

4. The method of claim 3, wherein displaying the change in size of the display region comprises thickening an outline of the display region to represent the displayed change in size.

5. The method of claim 3, wherein displaying the change in size of the display region comprises shading the display region to represent the displayed change in size.

6. The method of claim 2, wherein the detection region includes a 1-pixel region located in an outer region of the display region.

7. The method of claim 1, wherein changing the size of the display region comprises reducing a total size of the display region at a predetermined ratio based on the determined amount.

8. The method of claim 1, wherein changing the size of the display region comprises reducing the size of the display region in at least one direction based on the determined amount.

9. The method of claim 1, wherein the touch input comprises a multi-touch.

10. An electronic apparatus comprising:
a touchscreen; and
a control unit configured to:
    detect a touch input,
    determine an amount of a display change based on a touch point that corresponds to a location of the touch input on the touchscreen,
    determine a display change direction based on the touch point, and
    change a size of the display region based on the determined amount and the display change direction,
    wherein the display region comprises a region of the touchscreen on which information is displayed.

11. The electronic apparatus of claim 10, wherein the control unit is configured to determine, in response to detecting a touch to at least one detection region included in the display region, whether a size change event occurs based on touch information on the detection region, and detect, in response to determining that the size change event occurs, the touch input to change the size of the display region.

12. The electronic apparatus of claim 11, wherein the touchscreen is configured to display size change event occurrence information in response to the occurrence of the size change event.

13. The electronic apparatus of claim 12, wherein displaying the change in size of the display region comprises thickening an outline of the display region to represent the displayed change in size.

14. The electronic apparatus of claim 12, wherein displaying the change in size of the display region comprises shading the display region to represent the displayed change in size.

15. The electronic apparatus of claim 11, wherein the detection region includes a 1-pixel region located in an outer region of the display region.

16. The electronic apparatus of claim 10, wherein the control unit is configured to reduce a total size of the display region at a predetermined ratio based on the determined amount.

17. The electronic apparatus of claim 10, wherein the control unit is configured to reduce the size of the display region in at least one direction based on the determined amount.

18. The electronic apparatus of claim 10, wherein the touch input comprises a multi-touch.

* * * * *